(12) United States Patent
Minami et al.

(10) Patent No.: US 11,262,907 B2
(45) Date of Patent: Mar. 1, 2022

(54) DISPLAY DEVICE AND NON-TRANSITORY COMPUTER-READABLE STORAGE MEDIUM STORING DISPLAY PROGRAM

(71) Applicant: SEIKO EPSON CORPORATION, Tokyo (JP)

(72) Inventors: Takeshi Minami, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/133,746

(22) Filed: Dec. 24, 2020

(65) Prior Publication Data

US 2021/0200401 A1 Jul. 1, 2021

(30) Foreign Application Priority Data

Dec. 26, 2019 (JP) .............................. JP2019-235900

(51) Int. Cl.
*G06F 3/0485* (2013.01)
*H04N 1/00* (2006.01)

(52) U.S. Cl.
CPC ....... *G06F 3/0485* (2013.01); *H04N 1/00411* (2013.01); *H04N 1/00413* (2013.01); *H04N 1/00469* (2013.01); *H04N 1/00501* (2013.01); *H04N 2201/0093* (2013.01); *H04N 2201/0094* (2013.01)

(58) Field of Classification Search
CPC combination set(s) only.
See application file for complete search history.

(56) References Cited

U.S. PATENT DOCUMENTS

| 6,233,015 | B1 | 5/2001 | Miller et al. |
| 10,984,232 | B2* | 4/2021 | Matsumoto .......... G06K 9/6878 |
| 2015/0160818 | A1* | 6/2015 | Takamiya ............. G06F 3/0488 715/784 |
| 2017/0025096 | A1* | 1/2017 | Fan ........................ H04L 51/04 |
| 2019/0089193 | A1* | 3/2019 | Ranjan ................... G05B 15/02 |

FOREIGN PATENT DOCUMENTS

JP H11-168694 A 6/1999

* cited by examiner

*Primary Examiner* — Helen Zong
(74) *Attorney, Agent, or Firm* — Global IP Counselors, LLP

(57) ABSTRACT

A display device includes a display controller that causes a touch panel to scroll display a plurality of button images, wherein compared with the number of characters displayed in a plurality of button images in a first state being not scrolled, the display controller reduces the number of characters displayed in a plurality of the button images in a second state being scrolled by starting scroll from the first state. Thereby, it is possible to make the scroll speed higher than before.

9 Claims, 11 Drawing Sheets

FIG. 2

| | | | | |
|---|---|---|---|---|
| No. 001 | ☎ | Name:James | Tel:*--** | ∼AD |
| No. 002 | ☎ | Name:Oliver | Tel:*--** | ∼AD |
| No. 003 | ☎ | Name:Michael | Tel:*--** | ∼AD |
| No. 004 | ☎ | Name:Lucas | Tel:*--** | ∼AD |
| No. 005 | ☎ | Name:Mason | Tel:*--** | ∼AD |
| No. 006 | ☎ | Name:Jacob | Tel:*--** | ∼AD |
| No. 007 | ☎ | Name:Daniel | Tel:*--** | ∼AD |
| No. 008 | ☎ | Name:Henry | Tel:*--** | ∼AD |

DISPLAY DEVICE AND NON-TRANSITORY COMPUTER-READABLE STORAGE MEDIUM STORING DISPLAY PROGRAM

The present application is based on, and claims priority from JP Application Serial Number 2019-235900, filed Dec. 26, 2019, the disclosure of which is hereby incorporated by reference herein in its entirety.

BACKGROUND

1. Technical Field

The present disclosure relates to a display device and a non-transitory computer-readable storage medium storing a display program.

2. Related Art

JP-A-11-168694 discloses an electronic still camera that generates a plurality of low-resolution filmstrips from a plurality of photographic images for a user to browse a plurality of stored photographic images. It is possible for the user to scroll display a plurality of the generated filmstrips.

In JP-A-11-168694, the amount of display information is reduced by lowering the resolution of photographic images to prevent deterioration of the scroll speed. However, there is no consideration on objects other than photographic images.

SUMMARY

According to an aspect of the present disclosure, there are provided a display device and a non-transitory computer-readable storage medium storing a display program. The display device includes an acquisition section configured to acquire information for displaying a display element including a character; and a display controller configured to scroll display a plurality of the display elements using the information, wherein compared with the number of characters displayed in a plurality of the display elements in a first state being not scrolled, the display controller reduces the number of characters displayed in a plurality of the display elements in a second state being scrolled by starting scroll from the first state. Thereby, it is possible to improve the scroll speed of a screen in the state in which a character string rather than a photograph is displayed.

BRIEF DESCRIPTION OF THE DRAWINGS

FIG. 2 is a diagram illustrating an example of address information.

DESCRIPTION OF EXEMPLARY EMBODIMENTS

First Embodiment

Figure 1:
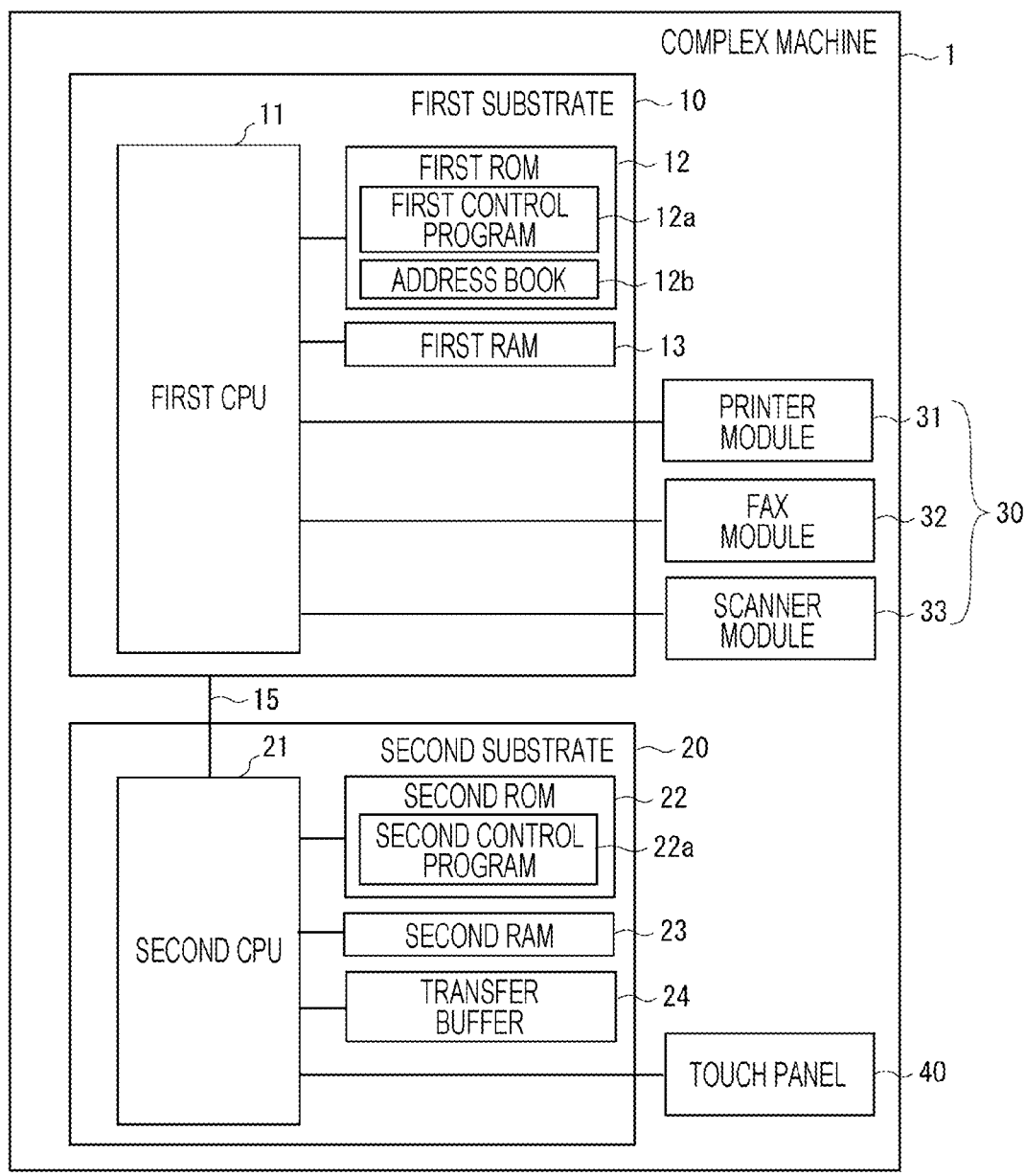
FIG. 1 is a block diagram illustrating the hardware configuration of a complex machine.

In the following, a description will be given of a display device according to an embodiment with reference to the accompanying drawings. In the present embodiment, a complex machine 1 with a touch panel 40 is given as the "display device" by example. FIG. 1 is a block diagram illustrating the hardware configuration of the complex machine 1. The complex machine 1 includes a first substrate 10, a second substrate 20, a module group 30, and the touch panel 40. The first substrate 10 and the second substrate 20 are coupled via a bus 15.

The first substrate 10 is the main control substrate of the complex machine 1 and includes a first CPU (central processing unit) 11, a first ROM (read only memory) 12, and a first RAM (random access memory) 13. The first CPU 11 loads a first control program 12a described later into the first RAM 13 so as to control the module group 30, and the like.

The first ROM 12 is a nonvolatile storage medium and stores a first control program 12a and an address book 12b. The first control program 12a is a program for the first CPU 11 to perform various kinds of control on the module group 30, and the like. The address book 12b stores address information 50 (refer to FIG. 2) described later. On the other hand, the first RAM 13 is a volatile storage medium and is used as a work area for the first CPU 11 to perform various kinds of control.

In this regard, the first substrate 10 may include a processor other than a CPU. For example, the first substrate 10 may include a hardware circuit, such as an ASIC (application specific integrated circuit), or the like as a processor. Also, the processor may have a configuration in which one or more CPUs and a hardware circuit, such as an ASIC, or the like operate in combination with each other. The second substrate 20 described later has the same configuration.

The module group 30 includes a printer module 31, a FAX module 32, and a scanner module 33. The printer module 31 is a printing mechanism that performs printing on a print medium, such as paper, or the like. The FAX module 32 is a FAX mechanism that sends and receives FAX. The scanner module 33 is a reading mechanism that reads a read medium, such as a document, or the like.

On the other hand, the second substrate 20 is a display control substrate and includes a second CPU 21, a second ROM 22, a second RAM 23, and a transfer buffer 24. The second CPU 21 is an example of the "acquisition section" and the "display controller". The second CPU 21 loads and executes a second control program 22a described later in the second RAM 23 so as to perform display control of the touch panel 40, and the like.

The second ROM 22 is a nonvolatile storage medium and stores the second control program 22a. The second control program 22a is a program for the second CPU 21 to perform various kinds of control on the display control of the touch panel 40, and the like. The second RAM 23 is a volatile storage medium and is used as a work area for the second CPU 21 to perform various kinds of control. The transfer buffer 24 is a buffer for the second CPU 21 to transfer the generated display data to the touch panel 40 and to display it.

The touch panel 40 displays various kinds of information and receives various operations. For example, the touch panel 40 displays a selection screen for selecting a transmission destination to which FAX is transmitted by the FAX module 32. The second CPU 21 displays two kinds of selection screens by switching them. More specifically, in the first state in which scroll is not performed, the second CPU 21 displays a first selection screen D1 (refer to FIG. 3), whereas in the second state in which scroll is performed, the second CPU 21 displays a second selection screen D2 (refer to FIG. 4). The second state is a state in which scroll has been started from the first state. Also, the first state is the state in which the scroll in the second state has been terminated, that is to say, the state in which the scroll speed has become zero. Hereinafter the first state is also referred to as a "non-scroll state".

Also, the touch panel 40 receives a selection operation of a button image B, which is one of the choices displayed on the first selection screen D1 and the second selection screen D2. The button image B is an image which illustrates, for example, a transmission destination of FAX. When the second CPU 21 receives a selection operation of a button image B on the touch panel 40, the second CPU 21 sets the telephone number displayed in the button image B as the transmission destination of FAX. In this regard, the button image B is an example of the "display element".

When the second CPU 21 displays the first selection screen D1 or the second selection screen D2, the second CPU 21 requests the first CPU 11 to obtain the information necessary for displaying a button image B. In response to this, the first CPU 11 reads the information requested from the second CPU 21 from the address book 12b and transmits the read information to the second CPU 21.

Next, a description will be given of the address information 50 stored in the address book 12b with reference to FIG. 2. As illustrated in FIG. 2, the address information 50 includes a plurality of address data AD. The address data AD is an example of the "information for displaying a display element". FIG. 2 illustrates eight pieces of the address data AD. The address data AD is data for displaying a button image B (refer to FIG. 3, and the like).

The address data AD includes registration number data 51, symbol data 52, name data 53, and attached data 54. The registration number data 51 indicates a registration number of the address data AD. Also, the symbol data 52 indicates the type of the address data AD. The address data AD illustrated in FIG. 2 represents a telephone number, and thus the symbol data 52 is data denoted by a symbol of a telephone. Also, the name data 53 indicates a telephone destination, that is to say, a name or a corporate name of a FAX transmission destination. Also, the attached data 54 indicates a telephone number. In FIG. 2, telephone numbers are all denoted by asterisks, but in reality, a different number is registered for each address data AD.

Also, in FIG. 2, only telephone numbers are registered as the attached data 54 of all the address data AD. However, instead of a telephone number, or in addition to a telephone number, an email address, data storage address, an address, or the like may be registered. When a user sends a fax or an email using the complex machine 1, or stores data in a data storage site on the Web, it is possible for the user to input a destination by selecting an address data AD instead of directly inputting the destination. Also, when a user prints the address side of a postcard, it is possible for the user to input an address and a name by selecting address data AD instead of directly inputting the address and the name of the other party.

Figure 3:
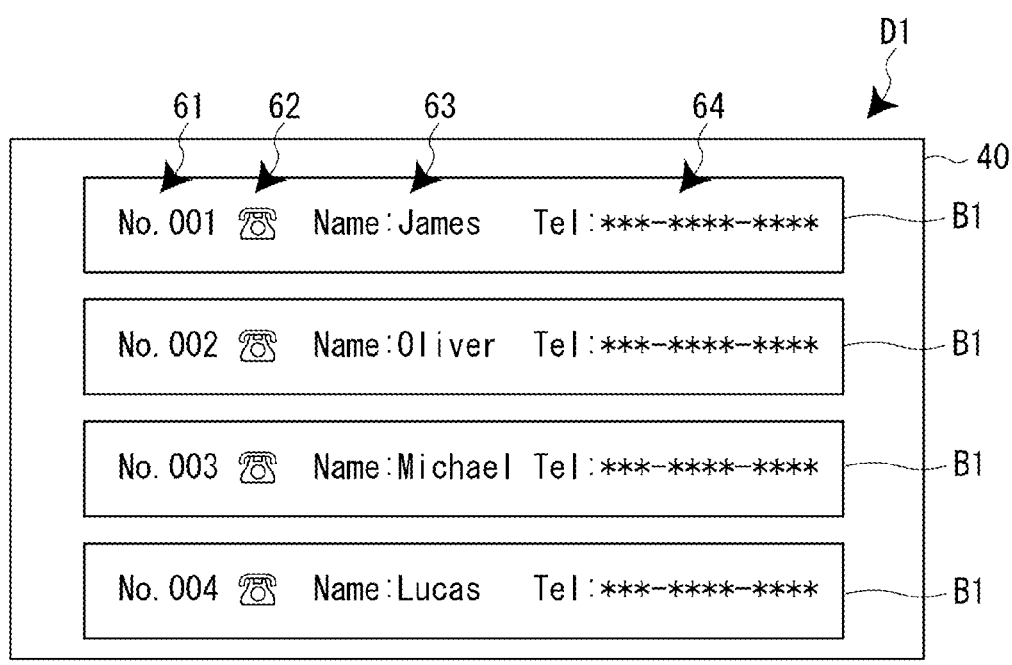
FIG. 3 is a diagram illustrating a display example of a first selection screen.

Next, a description will be given of a selection screen to be used for a user to select address data AD with reference to FIG. 3 and FIG. 4. FIG. 3 is a diagram illustrating a display example of the first selection screen D1. The first selection screen D1 is a screen displayed in the non-scroll state. In this regard, in the following description, a button image B displayed on the first selection screen D1 is referred to as a "first button image B1", and a button image B displayed on the second selection screen D2 is referred to as a "second button image B2".

On the first selection screen D1, a plurality of first button images B1 are displayed by being arranged in the Y-direction. In the example in FIG. 3, four first button images B1 are displayed. Also, in the plurality of first button images B1, the characters of a first item 61, a second item 62, a third item 63, and a fourth item 64 are displayed in a superimposed manner on the image indicating a button frame. Here, a character refers to a concept including a character, such as a numeral, a symbol, a pictograph, and the like in addition to a character that indicates a language, such as a Kana character, a Chinese character, an alphabet, and the like.

The first item 61 indicates a registration number based on the registration number data 51 of the address information 50. The second item 62 indicates a symbol based on the symbol data 52 of the address information 50. The third item 63 indicates a name based on the name data 53 of the address information 50. Also, the fourth item 64 indicates a telephone number based on the attached data 54 of the address information 50. In the example in FIG. 3, the characters included in each item are displayed in one line in the X-direction.

As illustrated in FIG. 3, in the non-scroll state, the second CPU 21 displays first button images B1 including four items. Accordingly, when the second CPU 21 displays the first selection screen D1, the second CPU 21 requests the information necessary for displaying the four items from the first CPU 11. The information necessary for displaying the four items includes the registration number data 51, the symbol data 52, the name data 53, and the attached data 54.

Figure 4:
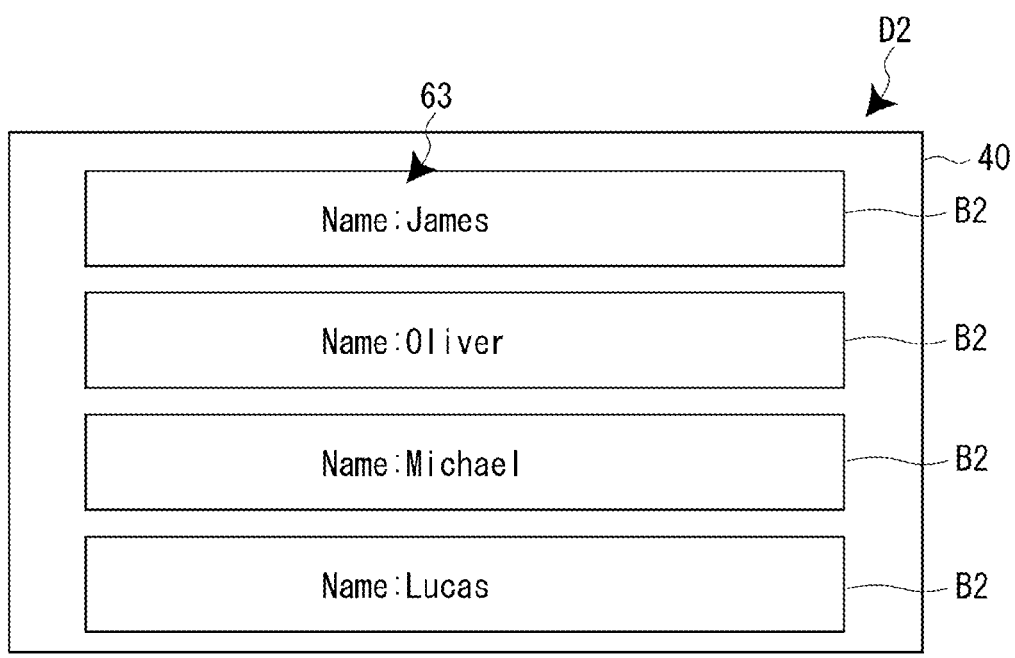
FIG. 4 is a diagram illustrating a display example of a second selection screen.

FIG. 4 is a diagram illustrating a display example of the second selection screen D2. The second selection screen D2 is a screen displayed in the second state, that is to say, in the scroll state. As illustrated in FIG. 4, the second CPU 21 displays the second button image B2 including only the third item 63 in the scroll state. Accordingly, when displaying the second selection screen D2, the second CPU 21 requests only the information necessary for displaying the third item 63, that is to say, the name data 53 from the first CPU 11.

In this regard, the number of the second button images B2 displayed on the second selection screen D2 and the number of the first button images B1 displayed on the first selection screen D1 are the same. Also, all the size, the font, and the color of the characters displayed in the second button image B2 are the same as those displayed in the first button image B1.

In this manner, the second CPU 21 reduces the number of items included in the second button image B2 displayed in the scroll state from the number of items included in the first button image B1 displayed in the non-scroll state. Thereby, the number of characters included in a plurality of second button images B2 displayed on the second selection screen D2 is smaller than the number of characters included in a plurality of first button images B1 displayed on the first selection screen D1. Accordingly, it is possible for the complex machine 1 to reduce the amount of information transmitted from the first substrate 10 to the second substrate 20 when scroll displaying the button images B. Also, thereby, it is possible to shorten the time to transmit the information from the first substrate 10 to the second substrate 20, and to eventually reduce the deterioration of the scroll speed in the scroll display of the touch panel 40.

In this regard, in the display examples illustrated in FIG. 3 and FIG. 4, the scroll direction of the button images B, that is to say, the movement direction of the button images B is the Y-direction. That is to say, when a +Y-direction scroll operation is performed on the touch panel 40 on which the first screen D1 or the second selection screen D2 is displayed, the second CPU 21 performs scrolling in the +Y-direction, and when a –Y-direction scroll operation is performed, the second CPU 21 performs scrolling in the –Y-direction. In this regard, the scroll operation is an operation to quickly move an operator, such as a finger, or the like on the touch panel 40 and includes a flick operation and a slide operation.

Next, a description will be given of the flow of the display processing performed by the complex machine 1 with reference to flowcharts of FIG. 5 and FIG. 6. The display processing is the processing realized by the second CPU 21 executing the second control program 22*a*. Also, the display processing is started in accordance with the selection of the address selection mode in which address data AD is selected in the complex machine 1, and is regularly performed until the address selection mode is terminated. Also, it is assumed that the display processing is performed in the state in which the first selection screen D1 (refer to FIG. 3) is displayed on the touch panel 40. In this regard, in parallel with this, the second CPU 21 stores the touched position and time on the touch panel 40 in the second RAM 23 every predetermined period.

Figure 5:
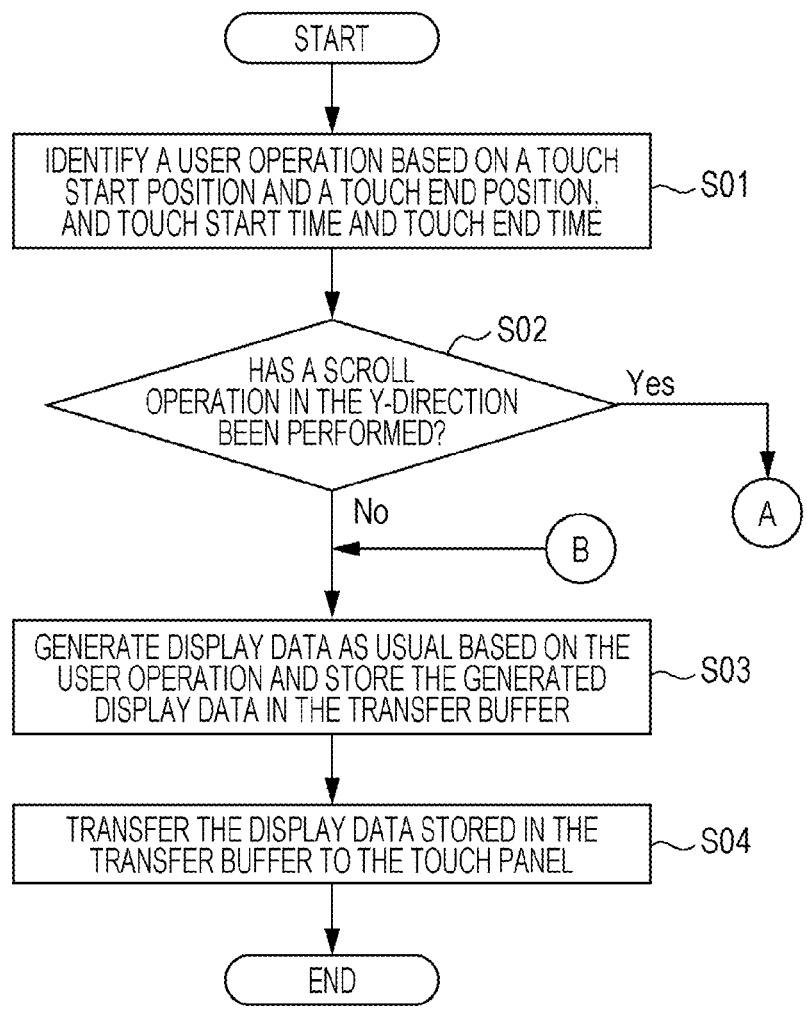
FIG. 5 is a flowchart of display processing.

As illustrated in FIG. 5, in S01, the second CPU 21 identifies a user operation based on the information stored in the second RAM 23, that is to say, the touch history.

In S02, the second CPU 21 determines whether or not a scroll operation in the Y-direction has been performed on the touch panel 40. When the second CPU 21 determines that a scroll operation in the Y-direction has been performed, the processing proceeds to S11 in FIG. 6. Also, when the second CPU 21 determines that a scroll operation in the Y-direction has not been performed, the processing proceeds to S03.

In S03, the second CPU 21 performs processing in accordance with the user operation. For example, when the user operation identified in S01 is a selection operation of a button image B, the second CPU 21 notifies the first CPU 11 of the selection of a button image B and generates the display data of the next screen in accordance with the instruction from the first CPU 11. Also, when the user operation identified in S01 is a scroll operation in the Y-direction, and the scroll state has ended, that is to say, when the display becomes the non-scroll state, the second CPU 21 generates the display data for displaying the first selection screen D1 (refer to FIG. 3).

In S04, the second CPU 21 transfers the display data stored in the transfer buffer 24 to the touch panel 40. After performing the processing in S04, the second CPU 21 terminates the display processing.

Figure 6:
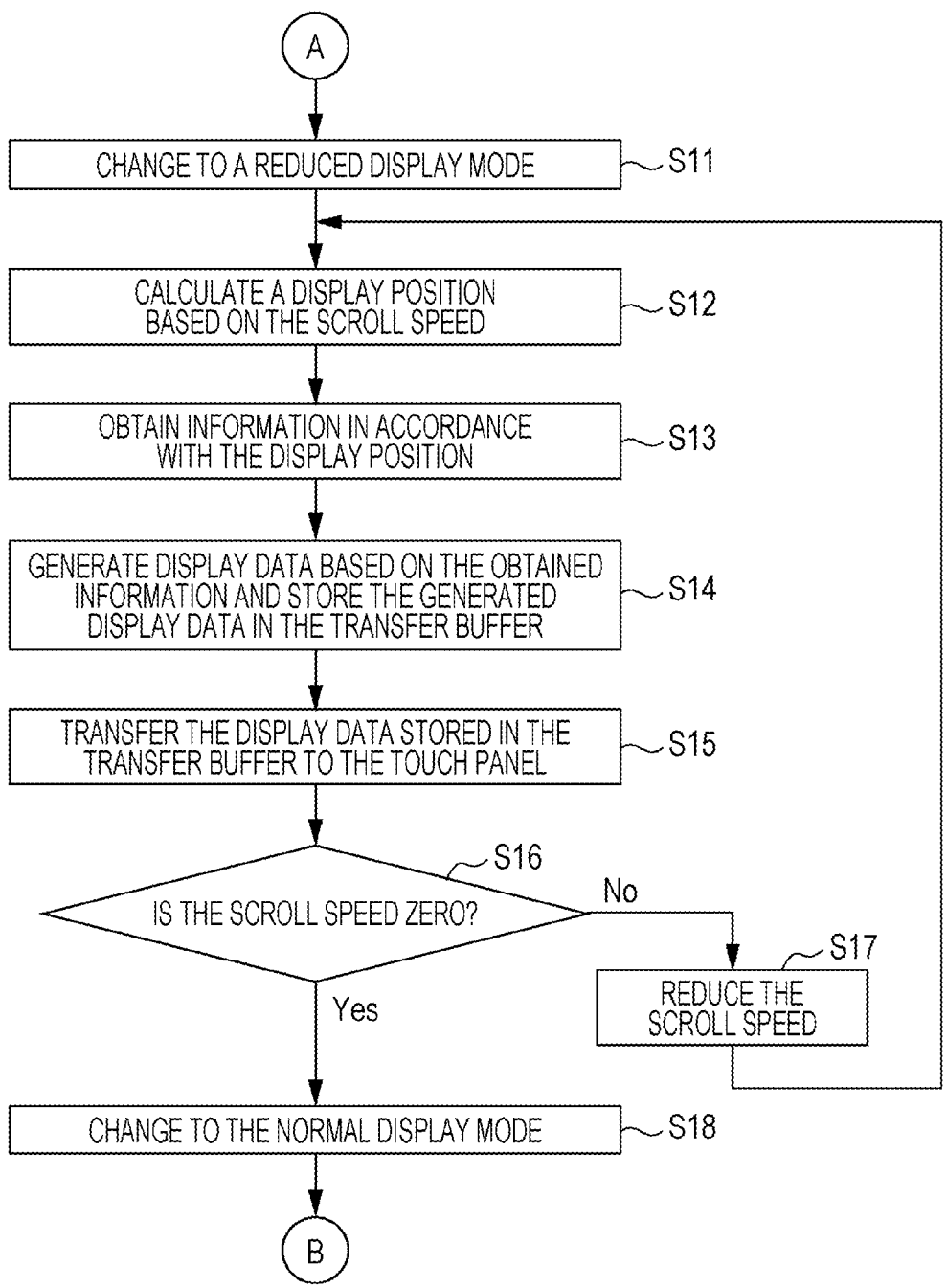
FIG. 6 is a flowchart of display processing, which is continued from FIG. 5.

As illustrated in FIG. 6, in S02, when the second CPU 21 determines that the scroll operation in the Y-direction has been performed, in S11, the second CPU 21 switches the display mode to the reduced display mode. That is to say, when the second CPU 21 determines that the scroll operation in the Y-direction has been performed in S02 in FIG. 5, the second CPU 21 determines that the display has proceeded from the non-scroll state to the scroll state and switches the display mode from the normal display mode to the reduced display mode. In other words, the normal display mode is the display mode in the non-scroll state, and the reduced display mode is the display mode in the scroll state.

In S12, the second CPU 21 calculates the display position to display as a result of the scrolling based on the time integration of the scroll speed. The display position is, in other words, the information indicating address data AD having what number of the registration number data 51 is to be displayed on the screen of the touch panel 40. In this regard, the initial value of the scroll speed, that is to say, the scroll speed of the case where the processing of S12 is first performed after the processing of S11 becomes the speed based on the user's scroll operation. The speed based on the scroll operation is the speed based on the touch start position, the touch end position, the touch start time, and the touch end time, which are stored in the second RAM 23. When the scroll operation by a user is less than or equal to a predetermined upper speed limit, the scroll speed may be the speed that matches the scroll operation by the user, whereas when the scroll operation by a user is more than the predetermined upper speed limit, the scroll speed may be determined as the upper speed limit. In this regard, the initial value of the scroll speed may not be a speed based on the scroll operation, but may be a fixed value.

In S13, the second CPU 21 obtains information in accordance with the display position. As described above, the second CPU 21 displays the second button images B2 including only the third item 63 in the scroll state (refer to FIG. 4). In the address information 50 stored in the address book 12*b*, the data corresponding to the third item 63 is name data 53. Accordingly, the second CPU 21 requests the first CPU 11 to obtain the name data 53 included in the address data AD corresponding to the display position calculated in S12. For example, as in the present embodiment, when displaying four button images B on the screen of the touch panel 40, the second CPU 21 determines to issue an acquisition request for the name data 53 included in the N-th to the (N+3)-th address data AD of the address information 50. Here, "N" is the display position calculated in S12 and is an integer greater than or equal to 1.

The second CPU 21 obtains the name data 53 transmitted from the first CPU 11 in response to the acquisition request. In this regard, after the first CPU 11 has transmitted the name data 53 included in the last address data AD of the address information 50 stored in the address book 12*b*, the first CPU 11 transmits the name data 53 included in the first address data AD. For example, when the address information 50 illustrated in FIG. 2 is stored in the address book 12*b*, and the first CPU 11 receives an acquisition request for the name data 53 included in the sixth to the ninth address data AD, the first CPU 11 transmits the name data 53 included in the sixth, the seventh, the eighth, and the ninth address data AD.

In this regard, when it is possible for the first CPU 11 to notify the second CPU 21 of the registration number of the address data AD registered in the address book 12*b*, the second CPU 21 may make an acquisition request of the name data 53 included in the address data AD by specifying a registration number of the address data AD.

Also, the second CPU 21 may not determine the name data 53 to be obtained in accordance with the display position. The second CPU 21 may notify the first CPU 11 of the scroll speed, and the first CPU 11 may transmit the information in accordance with the scroll speed to the second substrate 20.

In S14, the second CPU 21 generates display data based on the information obtained in S13 and stores the generated display data in the transfer buffer 24. The second CPU 21 generates display data for displaying the display data of the four second button images B2, that is to say, the second selection screen D2 based on the four pieces of name data 53 transmitted from the first CPU 11.

In S15, the second CPU 21 transfers the display data stored in the transfer buffer 24 to the touch panel 40.

In S16, the second CPU 21 determines whether or not the scroll speed is zero. When the second CPU 21 determines that the scroll speed is zero, that is to say, that the scroll state has ended, the processing proceeds to S18. On the other hand, when the second CPU 21 determines that the scroll speed is not zero, the processing of the second CPU 21 proceeds to S17.

In S17, the second CPU 21 reduces the scroll speed. In this regard, the second CPU 21 may reduce the scroll speed by a fixed amount every time the second CPU 21 performs the processing of S17 or may change the amount of speed reduction. After the processing of S17, the processing of the second CPU 21 proceeds to S12.

In S18, the second CPU 21 switches the display mode to the normal display mode.

As described above, the complex machine 1 according to the present embodiment reduces the number of items having a character displayed in the button image B in the scroll state from the number of items having a character displayed in the button image B in the non-scroll state. That is to say, in the scroll state, the complex machine 1 hides, the characters included in a part of the items out of a plurality of items displayed in the non-scroll state. Thereby, in the scroll state, it is possible to reduce the amount of information transmitted from the first substrate 10 to the second substrate 20, and to eventually prevent a decrease in the scroll speed. Also, thereby, it is possible for the user to quickly search for a desired button image B.

In this regard, in the first embodiment, it is possible to employ the following variations. Also, it is possible to suitably combine each of the variations.

Variation 1.1

In first embodiment, only one item is displayed in the second button image B2 regardless of the scroll speed in the scroll state. However, the number of items displayed in the second button image B2 may be changed in accordance with the scroll speed. For example, the second CPU 21 may stepwisely reduce the number of items having a character displayed in the button image B in the scroll state as the scroll speed becomes higher.

Figure 7:
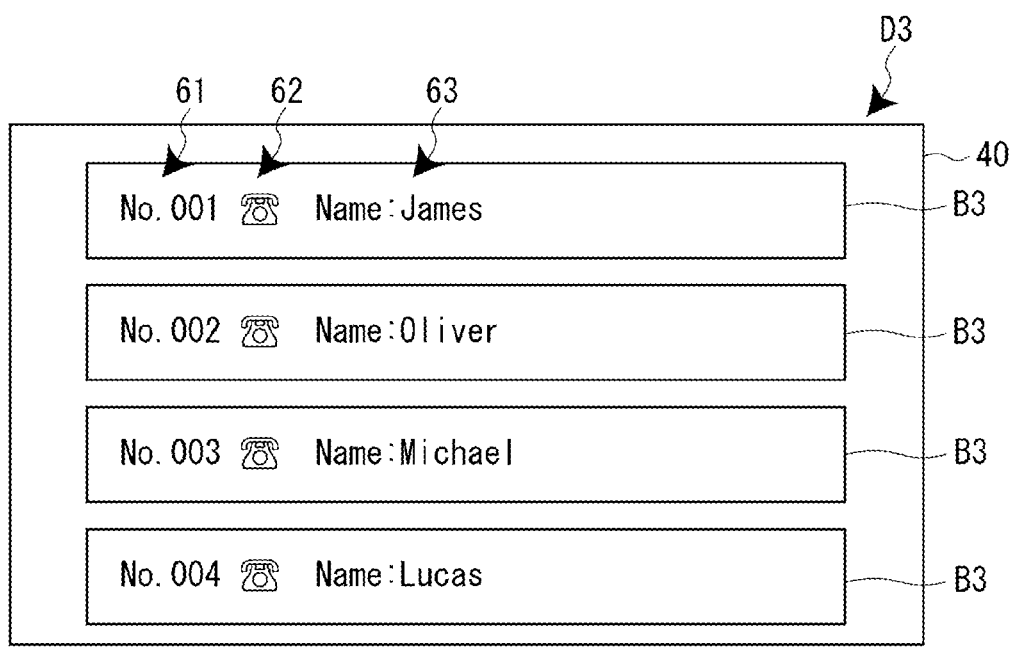
FIG. 7 is a diagram illustrating a display example of a third selection screen.

Here, a description will be given by giving an example on the assumption that the scroll speed becomes higher in the order of the first speed, the second speed, and the third speed. FIG. 7 is a diagram illustrating a display example of a third selection screen D3. The third selection screen D3 is a screen displayed in the third state when the scroll speed is the second speed. In the third state, the second CPU 21 displays a third button image B3 including three items in total, namely the first item 61, the second item 62, and the third item 63. In contrast, the second selection screen D2 illustrated in FIG. 4 is a screen displayed in the second state in which the scroll speed is a third speed. In the second state, the second CPU 21 displays the second button image B2 including only the third item 63. The first selection screen D1 illustrated in FIG. 3 is a screen displayed in the fourth state when the scroll speed is the first speed. In the fourth state, the second CPU 21 displays the first button image B1 including four items in total, namely the first item 61, the second item 62, the third item 63, and the fourth item 64 in the same manner as in the non-scroll state.

In this case, the second CPU 21 obtains information in accordance with the scroll speed and the display position in S13 in FIG. 6. That is to say, when the scroll speed is lower than a predetermined first speed threshold value, the second CPU 21 obtains the information for displaying the first selection screen D1. When the scroll speed becomes higher, and the scroll speed becomes higher than the first speed threshold value, the second CPU 21 switches to display from the first selection screen D1 to the third selection screen D3. Further, when the scroll speed becomes higher than a second speed threshold value, which is higher than the first speed threshold value, the second CPU 21 switches to display from the third selection screen D3 to the second selection screen D2. Also, when the scroll speed lowers, and the scroll speed becomes lower than the second speed threshold value, the second CPU 21 switches to display from the second selection screen D2 to the third selection screen D3. Further, when the scroll speed lowers than the first speed threshold value, the second CPU 21 switches to display from the third selection screen D3 to the first selection screen D1.

That is to say, as the scroll speed becomes higher, the display is changed in the order of the first selection screen D1, the third selection screen D3, and the second selection screen D2. Also, as the scroll speed becomes lower, the display is changed in the order of the second selection screen D2, the third selection screen D3, and the first selection screen D1. Here, the first speed threshold value is set in advance to a scroll speed at which obtaining information for displaying the first selection screen D1 is in time for scrolling. The second speed threshold value is set in advance to a scroll speed at which obtaining information for displaying the third selection screen D3 is in time for scrolling. In this manner, with the present embodiment, when the scroll speed is low, the complex machine 1 reduces the number of items to be displayed in the button image B, and thereby makes it possible for a user to visually recognize as many characters as possible.

In this regard, as further variations, in the scroll state, the second CPU 21 may not change the number of items to be displayed in accordance with the scroll speed in three stages, but may change the number of items to be displayed in accordance with the two stages, or the four stages or more.

Variation 1.2

In the first embodiment, it is assumed that the size of a character displayed in the button image B is not changed depending on whether or not in the scroll state. However, the size of a character may be changed in accordance with the scroll state. For example, the second CPU 21 may make the size of a character displayed in the second button image B2 larger than that displayed in the first button image B1.

Figure 8:
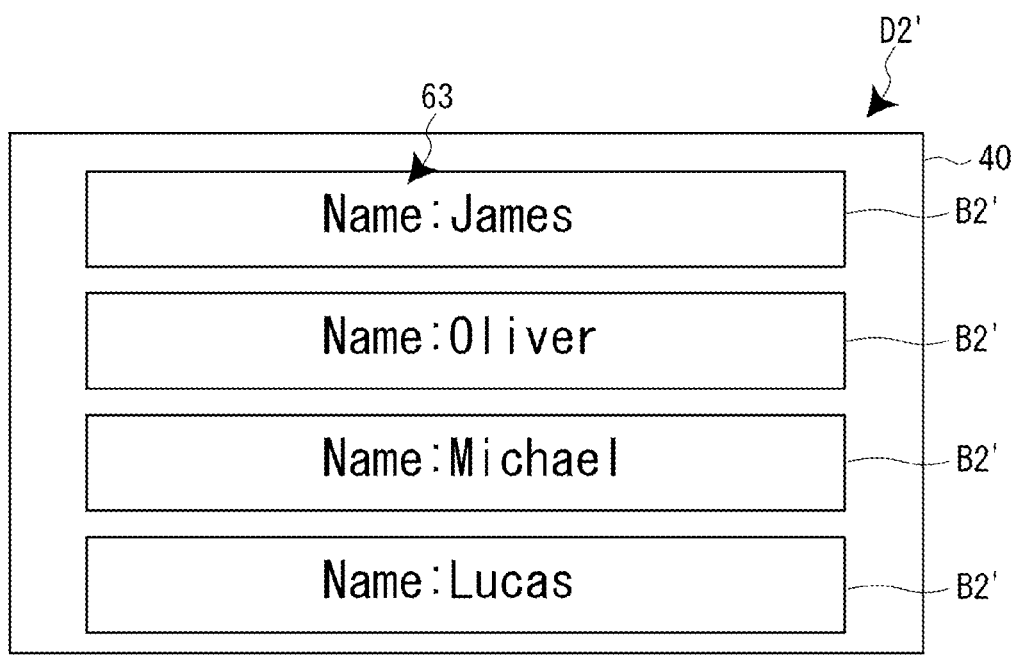
FIG. 8 is a diagram illustrating a display example of an enlarged second selection screen.

FIG. 8 is a diagram illustrating a display example of an enlarged second selection screen D2', which displays an enlarged second button image B2' produced by enlarging the character of the second button image B2. In this case, the second CPU 21 displays the first selection screen D1 (refer to FIG. 3) on the touch panel 40 in the non-scroll state, and displays the enlarged second selection screen D2' on the touch panel 40 in the scroll state. In the example of the enlarged second selection screen D2' illustrated in FIG. 8, the second CPU 21 enlarges the character size of the third item 63 with a predetermined enlargement ratio and displays the third item 63.

In this manner, with the present variation, the complex machine 1 makes the size of a character displayed in the scroll state larger than the size of a character displayed in the non-scroll state. Accordingly, it is possible to make it easier to view a character during the scroll display.

In this regard, as a further variation, the second CPU 21 may change the size of the button image B and the color and the font type of a character displayed in the button image B in accordance with the scroll state. For example, it may be possible to enlarge not only the character but also the size of the button image B itself in the scroll state.

Variation 1.3

It may be possible to combine the display control in accordance with the scroll speed according to the variation 1.1 and the control to change the character size according to the variation 1.2 so as to change the size of a character to be displayed in the second button image B2 in accordance with the scroll speed. For example, the second CPU 21 may make larger the size of a character displayed in the button image B at the second speed, which is higher than the first speed, than the size of a character displayed in the button image B when the scroll speed is the first speed in the scroll state.

Variation 1.4

The number of items displayed on the first selection screen D1 (refer to FIG. 3) does not have to match the number of types of data included in the address data AD. That is to say, when the second CPU 21 displays the first selection screen D1, the second CPU 21 may make an acquisition request of partial data out of a plurality of pieces of data included in the address data AD. Note that the number of items displayed on the first selection screen D1 is assumed to be larger than the number of items displayed on the second selection screen D2.

Variation 1.5

In the first embodiment, the number of items displayed in the button image B is changed in accordance with the scroll state. However, instead of the number of items, or in addition to this, the number of characters in an item may be changed. Specifically, the second CPU 21 may obtain only first three characters of the name data 53 included in the address data AD during low-speed scrolling, and may display only first one character of the name data 53 included in the address data AD during high-speed scrolling.

Second Embodiment

Next, a description will be given of a second embodiment. In the first embodiment, the second CPU 21 changes the number of items on which a character is displayed in the button image B depending on whether or not in the scroll state. However, in the present embodiment, the second CPU 21 changes the number of button images B to be displayed. In the following, a description will be given only of a different point from the first embodiment. In this regard, in the present embodiment, the same sign is given to the same component as that of the first embodiment, and the detailed description will be omitted.

In the present embodiment, the second CPU 21 makes smaller the number of button images B in which a character is display in the scroll state than the number of button images B in which a character is displayed in the non-scroll state.

Figure 9:
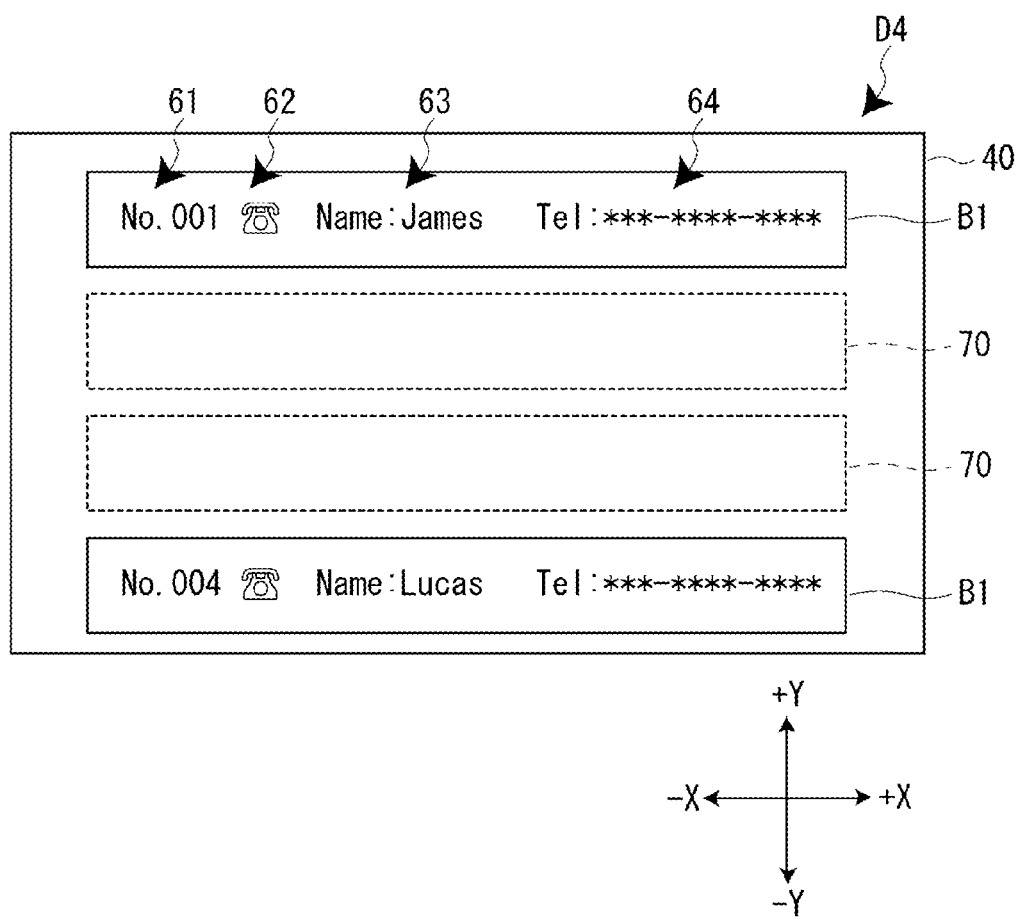
FIG. 9 is a diagram illustrating a display example of a fourth selection screen.

FIG. 9 is a diagram illustrating a display example of a fourth selection screen D4. The second CPU 21 displays the fourth selection screen D4 in the scroll state. Also, the second CPU 21 displays the first selection screen D1 (refer to FIG. 3) in the non-scroll state. As illustrated in FIG. 9 and FIG. 3, the second CPU 21 displays the first button image B1 regardless of whether or not in the scroll state. That is to say, in the present embodiment, the number of items displayed in the button image B is not changed regardless of whether or not in the scroll state.

Also, in the present embodiment, the second CPU 21 reduces the number of button images B in the scroll state from the number of button images B displayed in the non-scroll state. For example, in the example of the first selection screen D1 illustrated in FIG. 3, four first button images B1 are displayed, whereas in the example of the fourth selection screen D4 illustrated in FIG. 9, two first button images B1 are displayed. In FIG. 9, the reduced first button images B1 are illustrated by broken-line frames 70. However, the broken-line frames 70 may be hidden.

Also, in the example of the fourth selection screen D4 illustrated in FIG. 9, among the four first button images B1 displayed on the first selection screen D1, the two buttons located in the center in the Y-direction are deleted. That is to say, in the example of the fourth selection screen D4, the first button images B1 are displayed for every other two images. In this regard, it is desirable that in the scroll state, the second CPU 21 reduce the first button images B1 such that at least one image remains out of a plurality of first button images B1 displayable on one screen of the touch panel 40. However, it is further desirable that two images remain.

Also, in the present embodiment, the second CPU 21 obtains information for displaying the first button images B1 included in a screen as the information in accordance with the display position in S13 in FIG. 6. For example, when displaying the fourth selection screen D4 illustrated in FIG. 9, the second CPU 21 makes an acquisition request for the first and the fourth address data AD of the address information 50 (refer to FIG. 2), and obtains the information transmitted from the first CPU 11 in response to the acquisition request.

As described above, the complex machine 1 according to the present embodiment makes the number of button images B having a character displayed in the scroll state smaller than the number of button images B having a character displayed in the non-scroll state. That is to say, in the scroll state, the complex machine 1 hides the character included in a part of the button images B out of a plurality of button images B displayed in the non-scroll state. Thereby, in the scroll state, it is possible to reduce the amount of information transmitted from the first substrate 10 to the second substrate 20, and to eventually prevent deterioration of the scroll speed. Also, thereby, it is possible for a user to quickly search for a desired button image B.

In this regard, in the second embodiment, it is possible to employ the following variations. Also, it is possible to suitably combine the individual variations.

Variation 2.1

In the second embodiment, it is assumed that the number of button images B displayed in the scroll state is not changed depending on the scroll speed. However, in the same manner as the variation 1.1, the number of button images B displayed may be changed depending on the scroll speed. For example, the second CPU 21 may stepwise reduce the number of button images B having a character displayed in the scroll state as the scroll speed increases.

Figure 10:
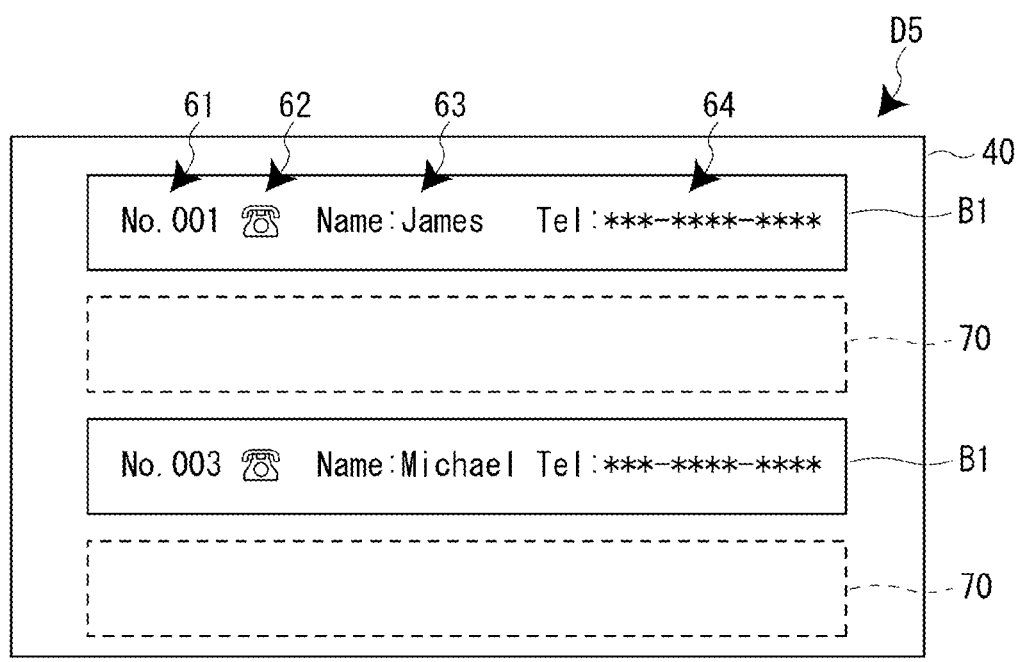
FIG. 10 is a diagram illustrating a display example of a fifth selection screen.

FIG. 10 is a diagram illustrating a display example of a fifth selection screen D5. The fifth selection screen D5 is a screen displayed in the third state when the scroll speed is the second speed. The second CPU 21 displays the first button images B1 at every other line in the third state. In contrast, the fourth selection screen D4 illustrated in FIG. 9 is a screen displayed in the second state when the scroll speed is the third speed. The second CPU 21 displays the first button images B1 at every other two lines in the second state. The first selection screen D1 illustrated in FIG. 3 is a screen displayed in the fourth state when the scroll speed is the first speed. The second CPU 21 displays all the first button images B1 in the fourth state.

In this case, in S13 in FIG. 6, the second CPU 21 obtains information in accordance with the scroll speed and the display position. That is to say, the second CPU 21 changes display in the order of the first selection screen D1, the fifth selection screen D5, and the fourth selection screen D4 as the scroll speed increases. Also, the second CPU 21 changes display in the order of the fourth selection screen D4, the fifth selection screen D5, and the first selection screen D1 as the scroll speed decreases.

In this manner, with the present variation, when the scroll speed is low, the complex machine 1 decreases the reduction amount of the number of button images B, and thereby it is possible for a user to view as many characters as possible.

In this regard, as a further variation, the second CPU 21 may change the number of button images B displayed in accordance with the scroll speed in the scroll state in two stages, or four stages or more rather than in three stages.

Variation 2.2

In the second embodiment, the size of a character displayed in the button image B is not changed depending on whether or not in the scroll state. However, the size of a character displayed may be changed in accordance with the scroll state. For example, the second CPU 21 may make the size of a character displayed in the button image B in the scroll state larger than the size of a character displayed in the button image B in the non-scroll state.

Figure 11:
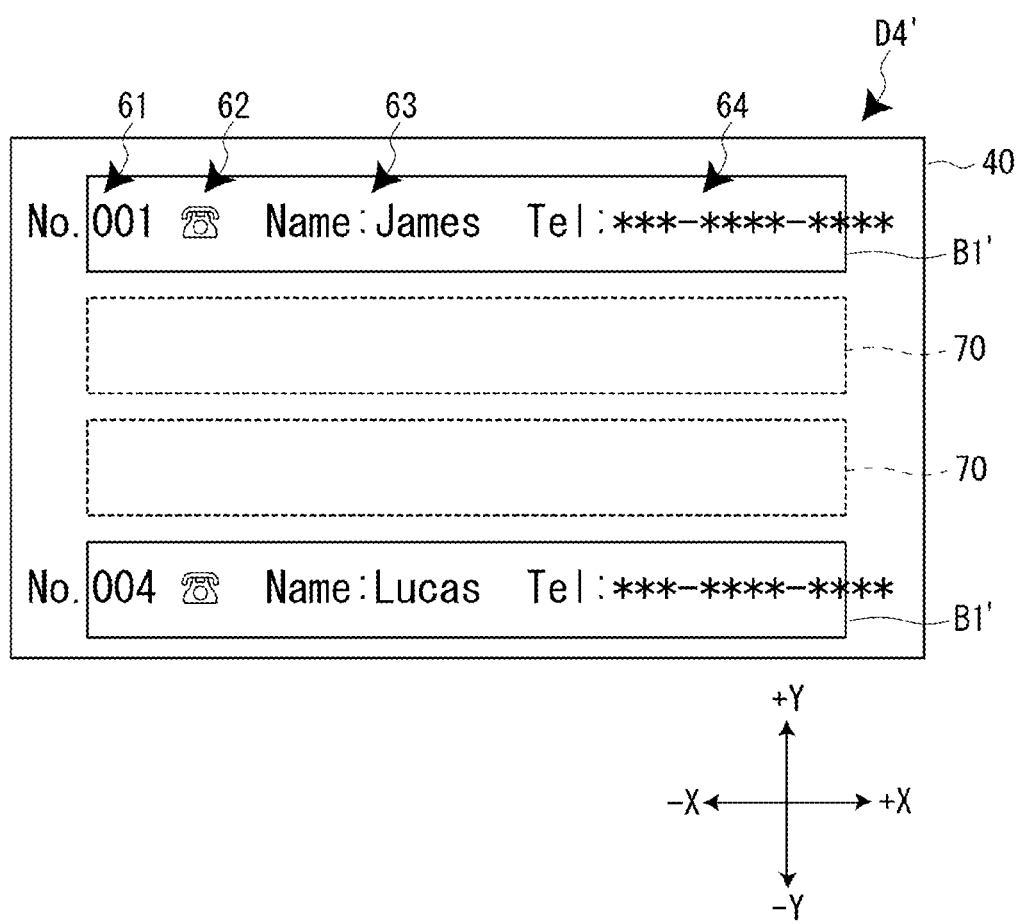
FIG. 11 is a diagram illustrating a display example of an enlarged fourth selection screen.

FIG. 11 is a diagram illustrating a display example of an enlarged fourth selection screen D4' in which a character displayed on the fourth selection screen D4 has been enlarged. In this case, in the non-scroll state, the second CPU 21 displays the first selection screen D1 (refer to FIG. 3) on the touch panel 40, whereas in the scroll state, the second CPU 21 displays the enlarged fourth selection screen D4' on the touch panel 40. In the example of the enlarged fourth selection screen D4' illustrated in FIG. 11, the second CPU 21 enlarges the character size of all the items, namely the first item 61, the second item 62, the third item 63, and the fourth item 64 with a predetermined enlargement ratio and displays them. Also, in the example in FIG. 11, the character size has been enlarged so that a part of the character is displayed by exceeding the button frame of the button image B. In this regard, in the example in FIG. 11, a part of a character is displayed by exceeding the button frame in the X-direction. However, a part of a character may be displayed by exceeding the button frame in the Y-direction.

In this manner, with the present variation, the complex machine 1 makes the size of a character displayed in the scroll state larger than the size of a character displayed in the non-scroll state. Accordingly, it is possible to make it easy to view a character during the scroll display.

In this regard, as a further variation, the second CPU 21 may change the size of the button image B, and the color and the font type of a character displayed in the button image B in accordance with the scroll state. Also, the second CPU 21 may determine the enlargement ratio of the character size of the enlarged fourth selection screen D4' to the character size of the fourth selection screen D4 such that all the characters included in the button image B have the maximum sizes that fit in the button frame of the button image B. Also, the second CPU 21 may enlarge only a part of a plurality of items displayed in the button image B and displays the part.

Variation 2.3

It may be possible to combine the display control in accordance with the scroll speed according to the variation 2.1 and the control of changing the character size according to the variation 2.2 so as to change the size of a character displayed in accordance with the scroll speed. For example, in the scroll state, the second CPU 21 may make the size of a character displayed in the button image B at the second speed higher than the first speed larger than the size of a character displayed in the button image B when the scroll speed is the first speed.

It is possible to employ the following variations in common with the two embodiments described above. Also, it is possible to suitably combine the individual variations.

Variation 3.1

The individual selection screens do not have to be screens for selecting a FAX transmission destination. For example, when the complex machine 1 is connected to a network, and it is possible to transmit scan data to an external device via the network, the selection screen may be a screen for selecting a transmission destination of the scan data. Also, when the complex machine 1 is connected to a network, and it is possible to transmit print data to another printer or an external device via the network, the selection screen may be a screen for selecting a transmission destination of the print data. In addition, it is possible to apply to various selection screens as long as it is a selection from a multiple choice set.

Variation 3.2

The display element to be scrolled is not limited to the button image B. For example, the display element may not be a target of selection operation. Also, the display element may not be enclosed with a frame. For example, the display element may be a "line" of a sentence.

Variation 3.3

Also, the display element may be arranged in a plurality of lines rather than in one line in the scroll direction. That is to say, the display elements may be tiled in the Y-direction and in the X-direction. In this case, it may be possible to allow scrolling both in the Y-direction and in the X-direction, or to allow scrolling either in the Y-direction or in the X-direction.

Variation 3.4

In each of the embodiments described above, it is assumed that the address book 12b is stored in the first substrate 10. However, when the complex machine 1 is connected to an external device via a network, the address book 12b may be stored in the external device. In this case, the first CPU 11 ought to receive an acquisition request from the second CPU 21 and to request the information from the external device. Also, when the complex machine 1 is connected to an external device via a network, the complex machine 1 does not have to include two substrates. That is to say, the controller of the complex machine 1 may make an acquisition request to the controller of the external device.

Variation 3.5

In each of the embodiments described above, the number of characters is changed by only a user performing the scroll operation. However, in addition to this, the number of characters may be changed by a user changing the character size via a setting screen. For example, when a user has bad eyesight and increases the character size in the setting screen, the number of button images B displayed on the screen may be decreased by the corresponding amount while increasing the size of a character displayed in the first button image B1, or the number of items displayed in one button image B may be decreased so that the second item 62 is not displayed. In this case, the number of characters is decreased in the scroll state from that in the non-scroll state so that the amount of information obtained by the second CPU 21 is reduced. However, in this case, it is desirable that the speed threshold value from which the number of characters is decreased be higher than the normal state in which the character size is not set large. This is because it is desirable for a user that the number of characters displayed be large if the scroll speed is not affected.

Variation 3.6

In each of the embodiments described above, the example in which the touch panel 40 included in the complex machine 1 is used as a display. However, a separate display or a projector connected to the complex machine 1 and having no operation-receiving function may be used as a display. Also, the scroll operation may be performed by using an operator other than a display. As the operator, for example, it is possible to use a mechanical cross key. In this case, the scroll speed may be gradually increased by a user continuing to press a key.

Variation 3.7

It may be possible for a user to select either one or a combination of the display control according to the first embodiment and the display control according to the second embodiment as the display control in the reduced display mode. The combination is, for example, a mode in which in the scroll state, a character of only a part of the button images B is displayed, and the number of items displayed in one button image B is reduced from that in the non-scroll state.

Variation 3.8

A method of performing each of the processing of the complex machine 1 described in the above embodiments and variations, a program for executing each of the processing, and a computer-readable recording medium recording the program are also included in a scope of right of the disclosure. Also, instead of the complex machine 1, it may be possible to use an electronic device having a display function as the display device. In addition, modifications may be suitably made in the disclosure without departing from the spirit and scope of the disclosure.

Appendices

In the following, appendices will be given to the display device.

A complex machine 1, which is an example of a display device, includes a second CPU 21 configured to acquire information for displaying a display element including a character and to scroll a plurality of the display elements by using the information, wherein compared with the number of characters displayed in a plurality of display elements in a first state being not scrolled, the second CPU 21 reduces the number of characters displayed in a plurality of display elements in a second state being scrolled by starting from the first state. In particular, great advantages are obtained when information for displaying display elements particularly including a character is obtained by using a communication method having a low communication speed.

With this configuration, the complex machine 1 reduces the number of characters displayed in a plurality of button images B in the second state, which is being scrolled by starting scroll from the first state, from the number of characters displayed in a plurality of button images B in the first state being not scrolled. Thereby, it is possible for the complex machine 1 to reduce the amount of information to obtain during scrolling, and to eventually prevent a decrease in the scroll speed. Also, thereby, it is possible for the user to quickly search for a desired button image B.

In the complex machine 1 described above, the button image B may include a plurality of items including the character, and compared with the number of items having the character in the first state, the second CPU 21 may reduce the number of items having the character displayed in the second state.

With this configuration, compared with the number of items having the character displayed in the button image B in the first state being not scrolled, the complex machine 1 reduces the number of items having the character displayed in the button image B in the second state being scrolled. Thereby, it is possible for the complex machine 1 to reduce the amount of information necessary for scroll display.

In the complex machine 1 described above, compared with the number of button images B having the character displayed in the first state, the second CPU 21 may reduce the number of button images B having the character displayed in the second state.

With this configuration, compared with the number of button images B having the character displayed in the first state being not scrolled, the complex machine 1 may reduce the number of button images B having the character displayed in the second state being scrolled. Thereby, it is possible for the complex machine 1 to reduce the amount of information necessary for scroll display.

In the complex machine 1 described above, in the third state having a slower scroll speed than that in the second state, the second CPU 21 may reduce the number of characters displayed in a plurality of button images B displayed in the second state.

With this configuration, compared with the number of characters displayed in a plurality of button images B in the third state having a lower scroll speed than that in the second state, the complex machine 1 reduces the number of characters displayed in a plurality of button images B in the second state. Accordingly, when the scroll speed is low, it is possible for the complex machine 1 to reduce the decrease number of characters so as to allow a user to view as many characters as possible.

In the complex machine 1 described above, compared with the size of the character displayed in a plurality of button images B in the first state, the second CPU 21 may enlarge the size of the character displayed in a plurality of button images B in the second state.

With this configuration, compared with the size of the character displayed in the first state being not scrolled, the complex machine 1 may enlarge the size of the character displayed in a plurality of button images B in the second state being scrolled. Accordingly, it is possible for the complex machine 1 make it easy to view a character during the scroll display.

What is claimed is:

1. A display device comprising:
a processor configured to acquire information for displaying at least one display element each including a plurality of characters and configured to scroll the at least one display element, wherein
compared with a number of characters displayed in the at least one display element during a first state that is not being scrolled, the processor reduces a number of characters displayed in the at least one display element during a second state that is being scrolled by starting scroll from the first state, and
compared with a number of characters displayed in the at least one display element during a third state that is being scrolled and has a scroll speed lower than that of the second state, the processor increases the number of characters displayed in the at least one display element during the first state and reduces the number of characters displayed in the at least one display element during the second state.

2. The display device according to claim 1, wherein
the at least one display element includes a plurality of items each having a character, and
compared with a number of the items each having the character displayed in the first state, the processor reduces a number of the items each having the character displayed in the second state.

3. The display device according to claim 2, wherein
compared with a number of the items each having the character displayed in the third state, the processor reduces the number of the items each having the character displayed in the second state.

4. The display device according to claim 1, wherein
compared with a number of the at least one display element having the characters displayed in the first state, the processor reduces a number of the at least one display element having the characters displayed in the second state.

5. The display device according to claim 4, wherein
compared with a number of the at least one display element having the characters displayed in the third state, the processor reduces the number of the at least one display element having the characters displayed in the second state.

6. The display device according to claim 5, wherein
the at least one display element having the characters displayed in the first state includes a plurality of display elements each having the characters,
the processor reduces the number of the at least one display element having the characters displayed in the second state by replacing a set of the display elements each having the characters with a set of display elements each having no characters, respectively, and
the processor reduces the number of the at least one display element having the characters displayed in the third state by replacing a set of the display elements each having the characters with a set of display elements each having no characters, respectively.

7. The display device according to claim 1, wherein
compared with a size of the characters displayed in the at least one display element in the first state, the processor enlarges a size of the characters displayed in the at least one display element in the second state.

8. The display device according to claim 7, wherein
compared with a size of the characters displayed in the at least one display element in the third state, the processor decreases the size of the characters displayed in the at least one display element in the first state and enlarges the size of the characters displayed in the at least one display element in the second state.

9. A non-transitory computer-readable storage medium storing a display program for controlling a display device, the display program comprising:
a display function of displaying at least one display element each including a plurality of characters; and
a scroll function of scrolling the at least one display element, wherein
in the display function, compared with a number of characters displayed in the at least one display element during a first state that is not being scrolled, a number of characters displayed in the at least one display element during a second state that is being scrolled by starting scroll from the first state is reduced, and
in the display function, compared with a number of characters displayed in the at least one display element during a third state that is being scrolled and has a scroll speed lower than that of the second state, the number of characters displayed in the at least one display element during the first state is increased and the number of characters displayed in the at least one display element during the second state is reduced.

* * * * *